(12) United States Patent
Yang et al.

(10) Patent No.: US 7,854,454 B2
(45) Date of Patent: Dec. 21, 2010

(54) HEAD LAMP LOW SPEED COLLISION PROTECTOR

(75) Inventors: Ren Yang, Troy, MI (US); Riad E. Michael, Washington, MI (US); Daniel W. Atkinson, Royal Oak, MI (US); Aniruddna S. Ranade, Auburn Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 697 days.

(21) Appl. No.: 11/753,806

(22) Filed: May 25, 2007

(65) Prior Publication Data
US 2008/0290674 A1 Nov. 27, 2008

(51) Int. Cl.
*B60R 19/04* (2006.01)
(52) U.S. Cl. ..................................... 293/155
(58) Field of Classification Search ................. 293/155, 293/144, 145, 149, 150, 151, 152, 154
See application file for complete search history.

(56) References Cited

U.S. PATENT DOCUMENTS

| 3,820,834 A | * | 6/1974 | Wilfert et al. ............... 293/150 |
| 3,823,968 A | * | 7/1974 | Barenyi ...................... 293/131 |
| D245,597 S | * | 8/1977 | Gee et al. .................. D12/169 |
| 6,695,368 B1 | * | 2/2004 | Weykamp et al. ........... 293/154 |
| 7,478,849 B2 | * | 1/2009 | Fortin ......................... 293/120 |
| 2005/0275194 A1 | * | 12/2005 | Wegener ..................... 280/500 |

* cited by examiner

*Primary Examiner*—Hilary Gutman
(74) *Attorney, Agent, or Firm*—Ralph E. Smith

(57) ABSTRACT

A system for protecting a head lamp of a motor vehicle includes at least one headlamp protector device. The at least one headlamp protector device is adapted to be coupled to a bumper beam and adapted to be coupled to a crush can. The at least one headlamp protector device extends beyond the end of the bumper beam to protect the head lamp during an impact event.

16 Claims, 3 Drawing Sheets

HEAD LAMP LOW SPEED COLLISION PROTECTOR

FIELD

The present disclosure relates to front bumper systems, and more particularly to a head lamp low speed; collision protector for a front bumper system.

BACKGROUND

The statements in this section merely provide background information related to the present disclosure and may not constitute prior art.

Most motor vehicles have to comply with certain safety regulations, such as those outlined by the Insurance Institute for Highway Safety (IIHS) and the National Highway Traffic Safety Administration (NHTSA). These safety regulations can detail crash test or impact worthiness guidelines for various areas of the motor vehicle. An exemplary guideline may require the motor vehicle to endure a low speed frontal offset collision without sustaining damage to the head lamp. Damage to the head lamp can require costly repairs to the motor vehicle, and if the head lamp is damaged and cannot illuminate, the motor vehicle may be legally rendered undrivable.

SUMMARY

The present invention provides a system for protecting a head lamp of a motor vehicle. The system includes at least one headlamp protector device adapted to be coupled to a bumper beam and adapted to be coupled to at least one crush can. The at least one headlamp protector device extends beyond the end of the bumper beam to protect the head lamp during an impact event.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description Is merely exemplary in nature and is not intended to limit the present disclosure, application, or uses. Although the following description is related generally to a head lamp protector device for use with a front bumper system of a motor vehicle, it will be understood that the collision protector as described and claimed herein Is applicable to any type of bumper system in which increased offset collision protection is desired. Therefore, it will be understood that the following discussion is not intended to limit the scope of the appended claims to only front bumper applications.

Figure 1:
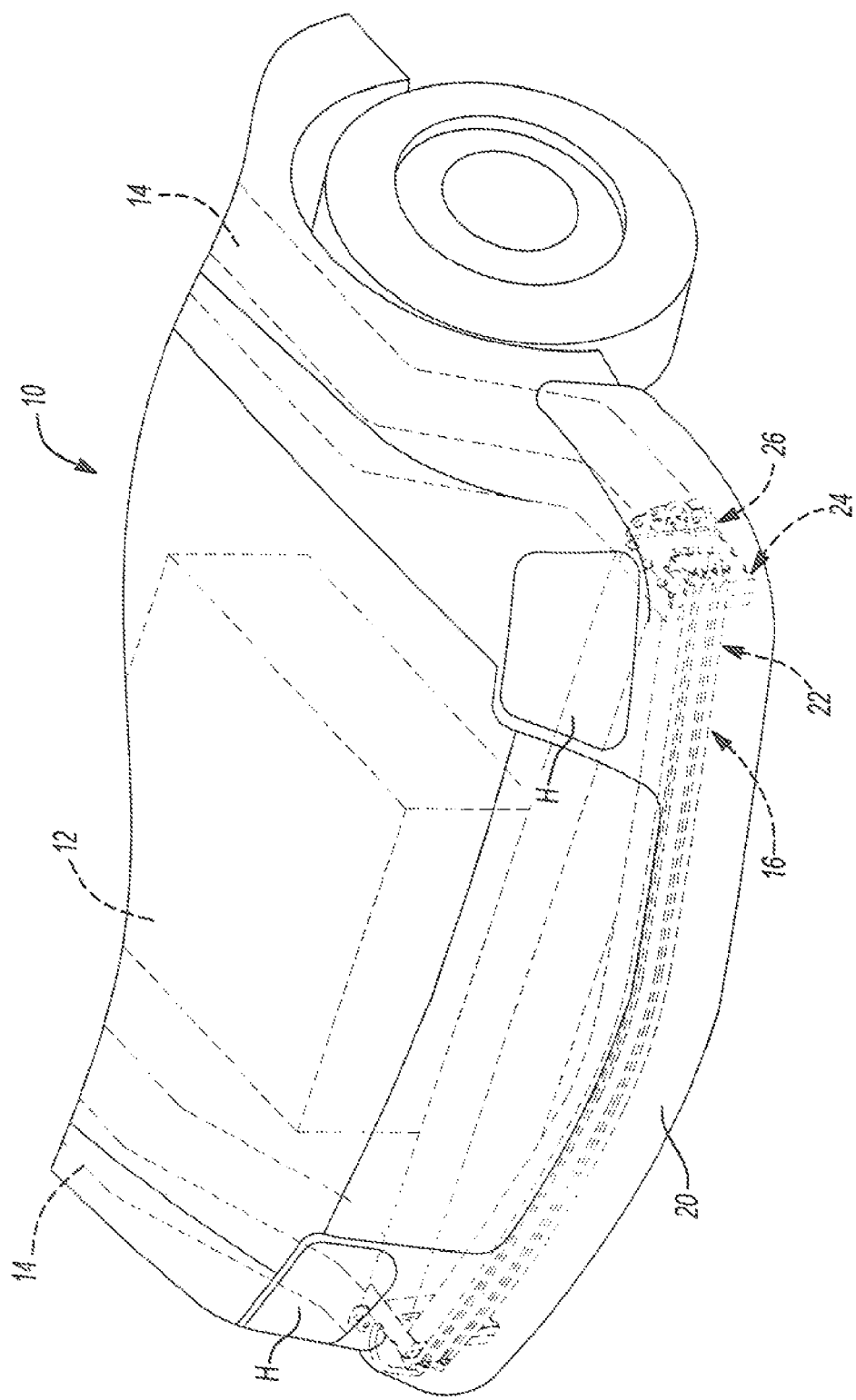
FIG. 1 is a partial view of an exemplary motor vehicle employing a front bumper system incorporating a head lamp protector device according to the principles of the present disclosure.
Figure 2:
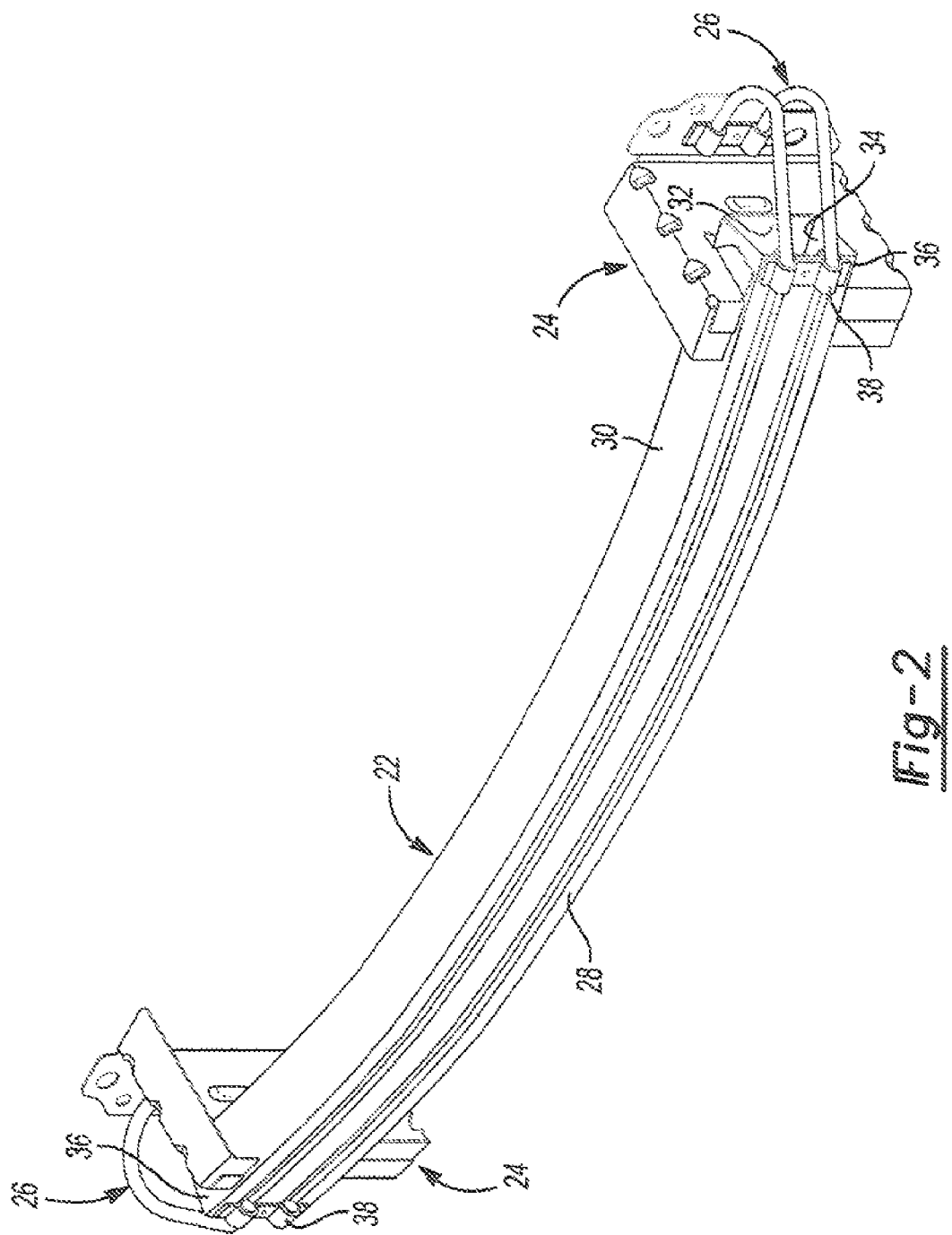
FIG. 2 is a perspective view of the headlamp device protector of FIG. 1.

With reference to FIGS. 1 and 2, an exemplary motor vehicle 10 is shown. The motor vehicle 10 includes a powertrain 12 coupled to a frame 14. A front bumper system 16 is coupled to the frame 14, in front of the powertrain 12, to protect the powertrain 12 from a collision. With reference to FIG. 1, the front bumper system 16 is coupled to the frame 14, and may be displaced a distance away from the powertrain 12. The front bumper system 16 includes a front fascia 20, a bumper beam 22, a crush can 24 and a headlamp protector device 28. The front fascia 20 is conformed to fit around the bumper beam 22, the headlamp protector device 28 and the crush can 24. As the front fascia 20 is generally known in the art, the front fascia 20 will not be discussed in great detail herein. The bumper beam 22 is formed of a metal or metal alloy, and may be shaped to conform to the frame 14 and a desired shape of the motor vehicle 10. As the bumper beam 22 is generally known in the art, the bumper beam 22 will not be discussed in great detail herein. Briefly, however, with reference to FIG. 2, the bumper beam 22 includes a first side 28, a second side 30, a third side 32, a fourth side 34 and ends 38.

The first side 28 of the bumper beam 22 includes a flange 38 at each end 36. The flange 38 includes one or more grooves 37 to couple the headlamp protector device 28 to the bumper beam 22. The second side 30, third side 32 and fourth side 34 receive the crush can 24, to couple the crush can 24 to the bumper beam 22.

Figure 3:
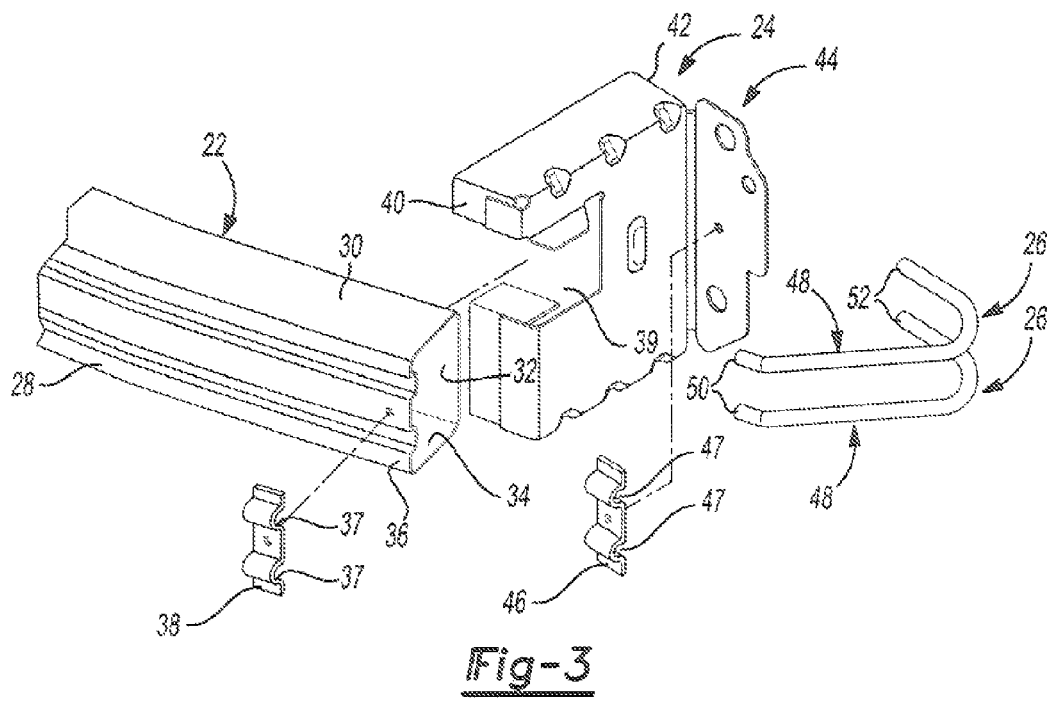
FIG. 3 is an exploded view of the headlamp protector device of FIG. 1.

With additional reference to FIG. 3, the crush can 24 is generally U-shaped and defines an opening 39. The crush can 24 also includes a first side 40 and a second side 42. The crush can 24 may be composed of a metal or a metal alloy. The opening 30 is sized such that the bumper beam 22 is received within the crush can 24. Generally, the opening 39 is sized such that the crush can 24 may be mechanically fastened to the second side 30, third side 32 and fourth side 34 of the bumper beam 22 through welding, mechanical fasteners and the like. The first side 40 of the crush can 24 abuts the first side 28 of the bumper beam 22.

The second side 42 of the crush can 24 includes a flange 44. The flange 44 is coupled parallel to the second side 42 of the crush can 24 such that the flange 44 extends outwardly from the second side 42 of the crush can 24. Thus, the flange 44 extends beyond the ends 36 of the bumper beam 22. The flange 44 includes a bracket 46. The bracket 46 is coupled to the flange 44 via mechanical fasteners, such as bolts, screws, etc. The bracket 46 includes grooves 47 to receive the headlamp protector device 26 to couple the headlamp protector device 28 to the crush can 24.

The headlamp protector device 26 is coupled to the crush can 24 and the bumper beam 22. The headlamp protector device 26 is generally coupled to the crush can 24 and bumper beam 22 such that the headlamp protector device 26 protects head lamps H of the motor vehicle 10 during a collision, such as a low speed 15% offset collision as shown in FIG. 1. It should be noted that although two headlamp protector devices 26 are shown, any number of headlamp protector devices 26 could be employed, such as one, three, etc. If multiple headlamp protector devices 26 are employed, each of the headlamp protector devices 26 may be arranged parallel to each other. With reference back to FIG. 3, each headlamp protector device 26 includes a body 48 that defines a first end 50 and a second end 52. The first end 50 is coupled to the flange 38, while the second end 52 is coupled to the crush can 24 by the bracket 46. Thus, the flange 38 and bracket 46 may include any number of grooves 37, 47 required to couple the desired number of headlamp protector device(s) 26 to the bumper beam 22 and crush can 24. In this example, as two headlamp protector devices 26 are employed, the flange 38 and bracket 46 each include two grooves 37, 47 respectively. The first end 50 and the second end 52 of the headlamp protector device 28 are generally coupled to the bumper beam 22 and crush can 24 by the flange 38 and bracket 46, however, any suitable fastening mechanism, such as welding, forming, adhesives, mechanical fasteners and/or the like could be employed.

The body 48 of the headlamp protector device 26 is configured to protect the head lamps H in a low speed offset collision. The body 48 is shaped to enable the first end 50 and the second end 52 to connect to each of the flange 38 and the bracket 46, while enabling the headlamp protector device 28 to extend beyond the ends 36 of the bumper beam 22. The body 48 may also be shaped to conform to the shape of the front fascia 20. The body 48 may be formed with any desirable tubular cross-section, such as square, circular, triangular, etc. The body 48 may also be hollow or solid, depending upon the desired strength of the body 48. The body 48 may be comprised of any suitable material, such as a metal, metal alloy or polymer that withstand a low speed offset collision, such as a steel or the like.

In order to couple the headlamp protector device 26 to the bumper beam 22, the first end 50 is positioned within the grooves 37 of the flange 38, and then the flange 38 is tightened to secure the first end 50 and the flange 38 to the bumper beam 22. Then, with the crush can 24 coupled to the bumper beam 22, the second end 52 is positioned within the grooves 47 of the bracket 46, and the bracket 46 is tightened to secure the bracket 48 and the second end 52 to the flange 44. It should be noted, however, that the first end 50 and second end 52 may be assembled in any order, and further, may be assembled simultaneously, by an automated machine, for example. With the headlamp protector device 26 coupled to the bumper beam 22 and the crush can 24, the front fascia 20 is positioned around the bumper beam 22 and the headlamp protector device 26 and secured, as known in the art.

Figure 4:
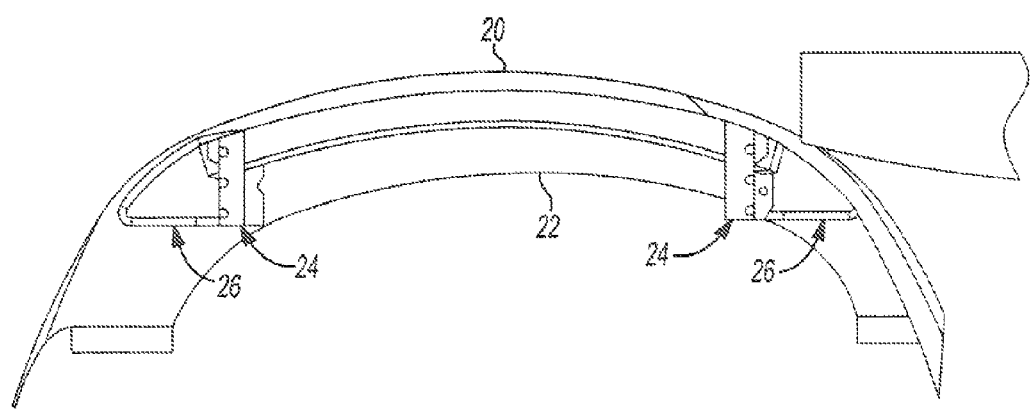
FIG. 4 is a schematic environmental view of the headlamp protector device of FIG. 1 during an impact with a barrier.

During a collision, such as a 15% offset low speed collision, with the headlamp protector device 26 coupled to the bumper beam 22, the headlamp protector device 28 protects the head lamps H of the motor vehicle 10 from damage, in this regard, the headlamp protector device 28 extends beyond the bumper beam 22 such that in an offset collision, the fascia 20 and headlamp protector device 26 are contacted prior to the head lamps H as shown In FIG. 4. In a low speed collision, the headlamp protector device 26 may prevent damage to the head lamps H as the headlamp protector device 26 absorbs the energy of the collision, and not the head lamps H. Thus, the headlamp protector device 26 reduces the cost of damages in a collision as it reduces the damage to the head lamps H. Further, by protecting the head lamps H in a collision, the motor vehicle 10 may remain drivable after a low speed offset collision.

While specific examples have been described in the specification and illustrated in the drawings, if will be understood by those of ordinary skill in the art that various changes may be made and equivalents may be substituted for elements thereof without departing from the scope of the present disclosure as defined In the claims. Furthermore, the mixing and matching of features, elements and/or functions between various examples Is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this disclosure, but that the scope of the present disclosure will include any embodiments falling within the foregoing description and the appended claims.

What is claimed is:

1. A system for protecting a head lamp of a motor vehicle comprising:
   at least one headlamp protector device having a first end affixed to a bumper beam and a second end affixed to at least one crush can, the at least one headlamp protector device extends beyond an end of the bumper beam to protect the head lamp during an impact event.

2. The system of claim 1, wherein the at least one crush can comprises two crush cans, the bumper beam having opposed ends with one of the crush cans affixed to one of the opposed ends of the bumper beam and the other crush can affixed to the other opposed end of the bumper beam.

3. The system of claim 2, wherein each crush can defines an opening that receives a respective opposed end of the bumper beam to affix that crush can to the bumper beam, with each crush can further comprising a flange opposite the opening, and the flange extends outwardly from the crush can such that the flange extends beyond the opposed end of the bumper beam to which that crush can is affixed.

4. The system of claim 3, wherein the opposed ends of the bumper beam each further comprises a flange coupled to that opposed end of the bumper beam, and the first end of the at least one headlamp protector device is affixed to the bumper beam by the flange of the bumper beam and the second end of the at least one headlamp protector device is affixed to the crush can by the flange of crush can.

5. The system of claim 4, wherein the at least one headlamp protector device includes two headlamp protector devices, the flange of each crush can includes a bracket, and the second end of one of the two headlamp protector devices is affixed to the flange of one of the crush cans and the second end of the other of the two headlamp protector devices is affixed to the flame of the other crush can.

6. The system of claim 4, wherein the at least one headlamp protector device includes two headlamp protector devices, one of the headlamp protector devices affixed at its first end to one of the opposed ends of the bumper beam and at its second end to the crush can affixed to that opposed end of the bumper beam, the other headlamp protector device affixed at its first end to the other opposed end of the bumper beam and at its second end to the crush can affixed to that other opposed end of the bumper beam, and the headlamp protector devices are formed with a tubular cross-section.

7. The system of claim 5, further comprising:
   a fascia coupled to the motor vehicle such that the fascia is positioned about at least a portion of the bumper beam and the at least one headlamp protector device; and
   wherein the at least one headlamp protector device is angled to enable the fascia to be disposed over the at least one headlamp protector device.

8. The system of claim 1, wherein the at least one headlamp protector device protects the head lamp from damage during at least a low speed frontal offset collision.

9. A system for protecting a head lamp of a motor vehicle comprising:
   a bumper beam coupled to the motor vehicle that defines a first side, a second side and ends;
   a plurality of crush cans coupled to the second side of the bumper beam, the plurality of crush cans each including a flange, the plurality of crush cans positioned such that each of the flanges project beyond each of the ends of the bumper beam; and
   a plurality of headlamp protector devices each having a first end coupled to the first side of the bumper beam and a second end coupled to the flanges of the plurality of crush cans to protect the head lamp of the motor vehicle from damage during at least a low speed frontal offset collision.

10. The system of claim 9, wherein the bumper beam further comprises a flange coupled to each end of the bumper beam, and the plurality of headlamp protector devices are coupled to the ends of the bumper beam by the flanges of the bumper beam.

11. The system of claim 10, wherein each flange of the plurality of crush cans includes a bracket that couples the plurality of headlamp protector devices to the flange of the plurality of crush cans.

12. The system of claim 11, the plurality of headlamp protector devices are formed with a tubular cross-section.

13. The system of claim 11, further comprising:
 a fascia coupled to the motor vehicle such that the fascia is positioned about at least a portion of the bumper beam and the plurality of headlamp protector devices; and
 wherein the plurality of headlamp protector devices are angled to enable the fascia to be disposed over the plurality of headlamp protector devices.

14. A system for protecting a head lamp of a motor vehicle comprising:
 a bumper beam coupled to the motor vehicle;
 a plurality of crush cans that define an opening to receive a respective end of the bumper beam to couple the plurality of crush cans to the bumper beam, each of the plurality of crush cans including a flange opposite the opening that extends beyond a respective end of the bumper beam;
 at least one headlamp protector device coupled to the bumper beam such that the at least one headlamp protector device extends beyond an end of the bumper beam;
 wherein the bumper beam further comprises a flange coupled to each end of the bumper beam, and the at least one headlamp protector device is coupled to the bumper beam by the flange of the bumper beam and to the crush can by the flange of the crush can;
 a fascia disposed over the bumper beam and the at least one headlamp protector device; and
 wherein the at least one headlamp protector device protects the head lamp from damage during a collision.

15. The system of claim 14, wherein the at least one headlamp protector device includes two headlamp protector devices coupled to each of the plurality of crush cans and each respective end of the bumper beam, and the headlamp protector devices are formed with a tubular cross-section; and
 wherein the headlamp protector devices are angled to enable the fascia to be disposed over the headlamp protector devices.

16. The system of claim 14, wherein the at least one headlamp protector device protects the head lamp from damage during at least a low speed frontal offset collision.

\* \* \* \* \*